United States Patent [19]

Berner et al.

[11] 4,351,708

[45] Sep. 28, 1982

[54] PHOTOCHEMICALLY OR THERMALLY POLYMERIZABLE MIXTURES

[75] Inventors: Godwin Berner, Rheinfelden; Rudolf Kirchmayr, Aesch, both of Switzerland

[73] Assignee: Ciba-Geigy Corporation, Ardsley, N.Y.

[21] Appl. No.: 236,463

[22] Filed: Feb. 20, 1981

[30] Foreign Application Priority Data

Feb. 29, 1980 [CH] Switzerland ................. 1629/80

[51] Int. Cl.³ .................................... C08F 2/46
[52] U.S. Cl. ..................... 204/159.23; 204/159.11; 204/159.21; 204/159.24
[58] Field of Search ............... 204/159.23, 159.11, 204/159.21, 159.24

[56] References Cited

U.S. PATENT DOCUMENTS

| | | | |
|---|---|---|---|
| 2,722,512 | 11/1955 | Crandall | 204/159.23 |
| 3,715,293 | 2/1973 | Sandner et al. | 204/159.14 |
| 3,729,313 | 4/1973 | Smith | 430/332 |
| 3,759,807 | 9/1973 | Osborn et al. | 204/159.23 |
| 3,966,573 | 6/1976 | Bean | 204/159.23 |
| 4,024,296 | 5/1977 | Gruber | 427/53 |

FOREIGN PATENT DOCUMENTS

| | | |
|---|---|---|
| A23002 | 7/1979 | European Pat. Off. |
| 1694149 | 10/1969 | Fed. Rep. of Germany |
| 1769853 | 9/1971 | Fed. Rep. of Germany |
| 1769854 | 9/1971 | Fed. Rep. of Germany |
| 2107934 | 10/1971 | Fed. Rep. of Germany |
| 2232365 | 1/1974 | Fed. Rep. of Germany |
| 2365497 | 4/1975 | Fed. Rep. of Germany |
| 2518639 | 11/1975 | Fed. Rep. of Germany |
| 2520489 | 10/1976 | Fed. Rep. of Germany |
| 2632294 | 1/1978 | Fed. Rep. of Germany |
| 2722264 | 11/1978 | Fed. Rep. of Germany |
| 1491539 | 11/1977 | United Kingdom |
| 2034317 | 6/1980 | United Kingdom |

OTHER PUBLICATIONS

F.A.M. Abdul-Rasoul et al., Polymer J., 19, 1219 (1978).
F. M. Beringer et al., J. Am. Chem. Soc., 75, 2705 (1953).
F. M. Beringer et al., J. Am. Chem. Soc., 81, 342 (1959).
Chem. Reviews, 68, 137 (1968).

Primary Examiner—Melvyn I. Marquis
Attorney, Agent, or Firm—Luther A. R. Hall

[57] ABSTRACT

Cationically polymerizable compounds can be polymerized photochemically and thermally when a combination of (a) an aromatic iodonium salt, (b) a photoinitiator from the series comprising the aromatic carbonyl compounds and (c) an agent which forms free radicals on heating is used as the catalyst. Polymerization is preferably effected in two stages, first photochemically and then thermally, or vice versa. Preferred substrates are epoxide compounds.

14 Claims, No Drawings

PHOTOCHEMICALLY OR THERMALLY POLYMERIZABLE MIXTURES

The invention relates to photochemically or thermally polymerisable mixtures of cationically polymerisable compounds and a specific catalyst combination and also to the corresponding process for the photochemical or thermally-initiated polymerisation of cationically polymerisable compounds.

Without special additives, cationically polymerisable compounds which do not have an ethylenically unsaturated group can not be polymerised either by irradiation or by heating. However, photochemical polymerisation of such compounds can be effected by the use of catalysts from the series comprising aromatic diazonium, sulfonium or iodonium salts, and the photopolymerisation can also be accelerated by the addition of a photoinitiator from the series comprising aromatic carbonyl compounds or aliphatic azo compounds, as has been described by F. Abdul-Rasoul, A. Ledwith and Y. Yagci in Polymer 1978, 1219–22.

In the same publication it is also reported that when agents which form free radicals on heating, for example benzoyl peroxide, azoisobutyronitrile or benz-pinacol, are added to aromatic iodonium salt catalysts, a thermally initiated polymerisation of cationically polymerisable compounds, for example tetrahydrofuran, is also possible.

In one case the aromatic carbonyl compound acts as the co-catalyst and in the other case the agent which forms free radicals on heating acts as the co-catalyst, since these compounds are not able on their own (without the onium salt) to catalyse the polymerisation.

The industrial advantage of photochemical or thermally-initiated polymerisation by means of such a 2-component catalyst over the conventional cationic polymerisation by means of a one-component catalyst, for example by means of $BF_3$ or a strong proton acid, is based on the fact that the cationic polymerisation already proceeds at room temperature, whilst the photochemical or thermally-initiated polymerisation takes place only on exposure to light or on heating. In the latter case, the catalysts can have been mixed into the substrate a long time prior to polymerisation. Such a mixture is stable on storage at room temperature with the exclusion of shortwave light and can be cured at any time by exposure to light or by heating, without any additives having to be mixed in beforehand.

As mentioned above, a mixture of this type can be polymerised photochemically, but not by heating, if it contains an aromatic carbonyl co-catalyst. On the other hand, a mixture of this type can be thermally but not photochemically polymerised if it contains an agent which forms free radicals on heating, as the co-catalyst. For specific purposes, it would be of industrial advantage if a polymerisable mixture which could be cured either photochemically or thermally—as needed—were available. It would then be possible to use the same resin for diverse applications, and this means that storage is further simplified. A further advantage would be that such a mixture can be cured in two stages by, for example, first exposing it to light and then curing it by the action of heat, or vice versa. 2-stage curing of this type is of great importance for the production of pre-formed parts, i.e. so-called prepregs.

It has been found that a mixture of this type which is curable in one of two ways or in two stages is obtained when a 3-component mixture of an aromatic iodonium salt, a photoinitiator from the series comprising the aromatic carbonyl compounds and an agent which forms free radicals on heating is used as the catalyst system.

The invention therefore relates to a photochemically or thermally polymerisable mixture containing (A) one or more cationically polymerisable compounds, (B) an aromatic iodonium salt as the polymerisation catalyst, (C) one or more photoinitiators from the series comprising the aromatic carbonyl compounds, as the co-catalyst, (D) an agent which forms free radicals on heating, as the second co-catalyst, and (E), if desired, further additives.

The invention also relates to a process for the polymerisation of cationically polymerisable compounds by irradiation with short-wave light or by heating or by irradiating and heating in the presence of an aromatic iodonium salt as the polymerisation catalyst, wherein a photoinitiator from the series comprising the aromatic carbonyl compounds and an agent which forms free radicals on heating are additionally used as co-catalysts.

Compounds polymerisable according to the invention are O- or S-containing saturated heterocyclic compounds, in particular those having 3, 4 or 5 ring members, and their derivatives. Examples are oxiranes, such as ethylene oxide, propylene oxide, epichlorohydrin, styrene oxide, phenyl glycidyl ether or butyl glycidyl ether; oxetanes, such as trimethylene oxide, 3,3-dimethyloxetane or 3,3-di-(chloromethyl)-oxetane; oxolanes, such as tetrahydrofuran or 2,3-dimethyltetrahydrofuran; cyclic acetals, such as trioxan, 1,3-dioxolane or 1,3,6-trioxacyclooctane; cyclic lactones, such as $\beta$-propiolactone, $\epsilon$-caprolactone and the alkyl derivatives thereof; thiranes, such as ethylene sulfide, 1,2-propylene sulfide or thioepichlorohydrin; and thietanes, such as 1,3-propylene sulfide or 3,3-dimethylthietane.

Further compounds polymerisable according to the invention are those ethylenically unsaturated compounds which are polymerisable by a cationic mechanism. Such compounds include mono- and di-olefins, for example isobutylene, 1-octene, butadiene and isoprene; styrene, allylbenzene or vinylcyclohexane; vinyl ethers, such as vinyl methyl ether, vinyl isobutyl ether or ethylene glycol divinyl ether; vinyl esters, such as vinyl acetate or vinyl stearate; N-vinyl compounds, such as N-vinylpyrrolidone or N-vinylcarbazole, and dihydropyran derivatives, for example the 3,4-dihydro-2H-pyran-2-carboxylic acid esters of 2-hydroxymethyl-3,4-dihydro-2H-pyran.

Further compounds polymerisable according to the invention are the prepolymers of phenol-formaldehyde resins, urea-formaldehyde resin or melamine-formaldehyde resins, and similar aminoplasts, and also mixtures of such aminoplasts with acrylic resins, alkyd resins or polyester resins containing functional groups. Further compounds polymerisable according to the invention are N-methylol derivatives of polycarboxylic acid amides, for example of polyacrylamide.

Compounds of particular importance amongst these polymerisable compounds which have been listed are the epoxide compounds, in particular the di- and polyepoxides and epoxide resin prepolymers, such as are used for the preparation of epoxide resins. This is usually effected by chemical curing with amines, phenols, dicarboxylic acid anhydrides and the like, either at room temperature or with heating. If the catalyst combinations according to the invention are used, the epoxides can be photochemically and thermally cured, without the addition of chemical reactants, i.e. a one-component system can be used.

The di- and poly-epoxides used for this purpose can be aliphatic, cycloaliphatic or aromatic compounds. Examples are the glycidyl ethers of aliphatic or cycloaliphatic diols or polyols, for example those of ethylene glycol, propane-1,2,-diol, propane-1,3-diol, butane-1,4-diol, diethylene glycol, glycerol, trimethylolpropane or 1,4-dimethylol-cyclohexane or of 2,2-bis-(4-hydroxycyclohexyl)-propane, and the glycidyl ethers of di- and poly-phenols, for example of resorcinol, 4,4'-dihydroxydiphenylmethane, 2,2-di-(4-hydroxyphenyl)-propane or novolacs. Further examples are the N-glycidyl compounds, for example the diglycidyl compounds of ethyleneurea, 1,3-propyleneurea or 5-dimethylhydantoin or of 4,4'-methylene-5,5'-tetramethyldihydantoin, or such as triglycidyl isocyanurate.

Further glycidyl compounds of industrial importance are the glycidyl esters of carboxylic acids, in particular of di- and poly-carboxylic acids. Examples are the glycidyl esters of adipic acid, phthalic acid, terephthalic acid, tetra- or hexa-hydrophthalic acid or isophthalic acid or of trimellitic acid.

Examples of polyepoxides, which are not glycidyl compounds, are the diepoxides of vinylcyclohexene and dicyclopentadiene, 3-(3,4'-epoxycyclohexyl)-8,9-epoxy-2,4-dioxaspiro[5.5]undecane, glycidyl 3,4-epoxycyclohexanecarboxylate or 3',4'-epoxycyclohexylmethyl 3,4-epoxycyclohexanecarboxylate, butadiene diepoxide or isoprene diepoxide, epoxidised linoleic acid derivatives or epoxidised polybutadiene.

Furthermore, it is also possible to use ethylenically unsaturated epoxides which are able to react polyfunctionally under the conditions according to the invention and thus are capable of forming crosslinked resins. Examples of such compounds are allyl glycidyl ether, glycidyl acrylate or glycidyl methacrylate or unsaturated polyepoxides such as partially (meth)acrylated epoxide resins.

The epoxide compounds can be used in mixtures with one another or in mixtures with other cationically polymerisable compounds or in mixtures with hydroxy compounds, for example in order to modify the physical properties of the resins obtainable therefrom. The epoxide compounds can also be pre-cured by chemical means, for example by reaction with diols or dicarboxylic acid anhydrides. The use of such prepolymers for the production of articles from epoxide resins can have certain advantages over the use of the di- and poly-epoxides, for example more simple storage and handling, more rapid processing to shaped articles and also the possibility for the incorporation of additives, such as glass fibres or pigments, into the prepolymers, for example during the preparation of prepregs.

The epoxide compounds can also be used in a mixture with ethylenically unsaturated compounds which are polymerisable by a free radical mechanism. Examples of such compounds are (meth)acrylates of mono- or poly-alcohols, (meth)acrylamides or acrylonitrile. These compounds also polymerise under the conditions of the process according to the invention, a mixture of polymers being formed.

The aromatic iodonium salts of component B which can be used according to the invention are known compounds, which are known to be able to initiate cationic reactions when they are irradiated with short-wave light. The use of such iodonium salts as photoinitiators for cationic polymerisations has been disclosed, for example, in German Offenlegungsschrift No. 2,518,639 or in German Offenlegungsschrift No. 2,520,489. These salts can be prepared, for example, by one of the methods listed in the Journal of Amer. Chem. Soc. 75, 2705 (1953) and 81, 342 (1959). The anions of these iodonium salts are complex halide anions, for example $BF_4^-$, $SbCl_6^-$, $AsF_6^-$, $SnCl_5^-$ or $BiF_6^-$.

Preferred iodonium salts are those of the formula

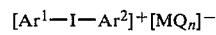

$$[Ar^1-I-Ar^2]^+[MQ_n]^- \qquad I$$

in which $Ar^1$ and $Ar^2$ independently of one another are phenyl, naphthyl or phenyl which is substituted by one or more of the radicals $C_1-C_8$-alkyl, phenyl, phenoxy, halogen, nitro or $C_1-C_4$-alkoxy, or $Ar^1$ and $Ar^2$ together are a divalent radical of the formula II

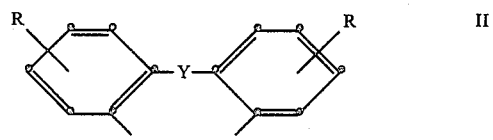

in which Y is a direct bond, —O—, —CH$_2$— or —CO— and R is $C_1-C_4$-alkyl, halogen, nitro or $C_1-C_4$-alkoxy, M is a metal atom or metalloid atom from the series comprising B, P, As, Sb, Sn, Bi and Fe, Q is fluorine or chlorine and n is 4, 5 or 6 and 1 larger than the valency of M.

Preferred iodonium salts of the formula I are those in which $Ar^1$ and $Ar^2$ are phenyl or tolyl and $[MQ_n]^-$ is one of the anions $BF_4^-$, $PF_6^-$, $AsF_6^-$ or $SbF_6^-$.

Examples of individual compounds of the formula I are: diphenyliodonium tetrafluoborate, di-(p-tolyl)-iodonium pentafluorostannate, di-(4-nitrophenyl)-iodonium hexafluorophosphate, di-(4-tert.-butylphenyl)-iodonium hexafluorostibiate, di-2-naphthyl-iodonium tetrafluoroborate, diphenyliodonium hexafluorophosphate, di-(4-diphenylyl)-iodonium hexafluoroarsenate, di-(3-methoxyphenyl)-iodonium hexachlorostibiate, phenyl-naphthyl-iodonium tetrafluoroborate, phenyl-4-fluorophenyl-iodonium hexafluorophosphate, phenyl-(2-chloro-4-nitrophenyl)-iodonium hexachlorostibiate, phenyl-(3,5-diisopropylphenyl)-iodonium tetrafluoborate, diphenyl-2,2'-diyl-iodonium hexafluorophosphate, diphenylmethane-2,2'-diyl-iodonium hexafluoroarsenate, (diphenyl oxide)-2,2'-diyl-iodonium hexafluorobismuthate, di-(4-nitrophenyl)-methane-2,2'-diyl-iodonium pentafluorostannate, [di-(4-chlorophenyl)-oxide]-2,2'-diyl-iodonium tetrafluoborate and 4,4'-dimethoxydiphenyl-2,2'-diyl-iodonium hexafluorophosphate.

The arylcarbonyl compounds used as the co-catalyst of component C are those which are known as photoinitiators. They possess in their molecule a benzoyl radical which can be cyclised in accordance with the following schematic formula

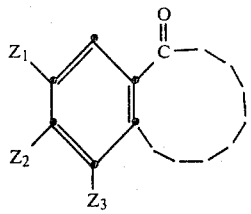

and can be substituted in the benzene nucleus. $Z^1$, $Z^2$ and $Z^3$ can be hydrogen or a monovalent substituent, for example halogen, nitro, alkyl, alkoxy, alkylthio, phenoxy, phenylthio or dialkylamino. Lists of arylcarbonyl compounds as photoinitiators are given in Chemical Reviews 68 (1968), 137-8, in U.S. Pat. No. 3,759,807 (columns 3 and 4), in U.S. Pat. No. 4,024,296 (column 3) or in U.S. Pat. No. 3,966,573 (column 2). Mixtures of different co-catalysts (C) can also be used.

Preferably, a photoinitiator from the series comprising benzoin, α-alkyl- and α-hydroxymethyl-benzoins, benzoin ethers, dialkoxyacetophenones, benzil monoketals, thioxanthone and derivatives of thioxanthone is used as component C.

Examples of α-alkylbenzoins are the photoinitiators named in U.S. Pat. No. 2,722,512, for example α-methylbenzoin or α-tert.-butyl-benzoin. Examples of α-hydroxymethylbenzoins are the photoinitiators described in German Auslegeschrift No. 1,769,853, for example α-hydroxymethyl-benzoin or α-hydroxymethyl-4,4'-dichlorobenzoin.

Examples of benzoin ethers are the photoinitiators described in German Pat. Nos. 1,694,149, 1,769,854 or 2,107,934, for example benzoin n-butyl ether, benzoin isobutyl ether, benzoin sec.-butyl ether and benzoin cyclohexyl ether or α-methylbenzoin methyl ether.

Examples of dialkoxyacetophenones are the photoinitiators described in U.S. Pat. No. 3,715,293, for example α,α-dimethoxy- or α,α-diethoxy-acetophenones.

Examples of benzil monoketals are the photoinitiators described in German Offenlegungsschriften Nos. 2,232,365 and 2,365,497, for example benzil dimethyl ketal or benzil ethylene ketal.

Examples of thioxanthone derivatives are 2-methyl-thioxanthone, 2-chlorothioxanthone or 2-isopropylthioxanthone.

Further compounds preferred as component C are arylcarbonyl compounds of the formula III

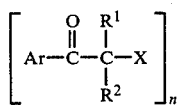

in which n is 1 or 2, Ar, if n is 1 is aryl having 6–14 C atoms, tetrahydronaphthyl, thienyl, pyridyl, furyl or phenyl which is substituted by one or more of the radicals F, Cl, Br, CN, OH, $C_1$–$C_{12}$-alkyl, —OAlk, —O-phenyl, —SAlk, —S-phenyl, —$SO_2$-phenyl, —COOAlk, and Alk is a lower alkyl radical having 1–4 C atoms, and, if n is 2, is $C_6$–$C_{12}$ arylene or a -phenylene-T-phenylene- group, X is one of the groups —$OR^4$ or —$OSiR^5(R^6)_2$, or together with $R^1$ is a —O—CH($R^7$)— group, T is —O—, —S—, —$SO_2$— or —$CH_2$—, $R^1$ is $C_1$–$C_8$ alkyl, which is unsubstituted or substituted by —OH, —OAlk, $C_2$–$C_8$ acyloxy, —COOAlk or —CN, or $C_3$–$C_4$ alkenyl, $C_5$–$C_6$-cycloalkyl or $C_7$–$C_9$ phenylalkyl, $R^2$ has one of the meanings defined for $R^1$ or is a —$CH_2CH_2R^8$ group, or together with $R^1$ is $C_2$–$C_8$ alkylene or $C_3$–$C_9$ oxa- or -aza-alkylene, $R^4$ is hydrogen, $C_1$–$C_{12}$ alkyl, $C_2$–$C_6$ alkyl which is substituted by OH, OAlk or CN, or $C_3$–$C_5$ alkenyl, cyclohexyl, benzyl, unsubstituted phenyl or phenyl substituted by Cl or Alk, or 2-tetrahydropyranyl, $R^5$ and $R^6$ are identical or different and are $C_1$–$C_4$ alkyl or phenyl, $R^7$ is hydrogen, $C_1$–$C_8$ alkyl or phenyl and $R^8$ is —$CONH_2$, —CONHAlk, —CON(Alk)$_2$, —P(O)(OAlk)$_2$ or 2-pyridyl.

Amongst these compounds, those compounds of the formula III are preferred in which n is 1 or 2, Ar, if n is 1, is phenyl, diphenyl, tetrahydronaphthyl or phenyl which is substituted by one or more of the radicals F, Cl, Br, $C_1$–$C_{12}$-alkyl, —O-phenyl or —OAlk, and, if n is 2, is $C_6$–$C_{12}$-arylene or a -phenylene-T-phenylene group, in which T is —O—, —S— or —$CH_2$—, and Alk is $C_1$–$C_4$-alkyl, X is one of the groups —$OR^6$ or —O-$SiR^7(R^8)_2$, $R^1$ is $C_1$–$C_8$-alkyl or —$CH_2CH_2COOAlk$ and $R^2$ is $C_1$–$C_8$-alkyl or allyl, or $R^1$ and $R^2$ together are $C_4$–$C_7$-alkylene, $R^4$ is H, $C_1$–$C_{12}$-alkyl, $C_2$–$C_4$-alkyl which is substituted by OH, —OAlk or CN, or allyl, benzyl or phenyl and $R^5$ and $R^6$ are methyl or phenyl, and in particular those compounds of the formula III in which n is 1, Ar is phenyl, chlorophenyl or $C_7$–$C_{10}$-alkylphenyl, $R^1$ and $R^2$ either are both methyl or together are pentamethylene and X is —OH, —$OCH_3$, —O-allyl or —$OSi(CH_3)_3$.

The compounds of the formula III have been disclosed in German Offenlegungsschrift No. 2,722,264 and also in EP publication No. 3002.

Examples of individual compounds of this type are: 2-hydroxy-2-methyl-propiophenone, 2-hydroxy-2-methyl-(p-chloropripiophenone), 2-hydroxy-2-methyl-(p-methylpropiophenone), 2-hydroxy-2-methyl-(p-isopropylpropiophenone), 2-hydroxy-2-methyl-(p-phenoxypropiophenone), 2-methoxy-2-methyl-(p-fluoropropiophenone), 2-(2-cyanoethoxy)-2-methylpropiophenone, 2-allyloxy-2-methyl-propiophenone, 2-cyclohexyloxy-2-methyl-propiophenone, 4,4'-di-(α-methyl-α-phenoxypropionyl)-diphenylmethane, 2-(α-hydroxy-α-methylpropionyl)-tetrahydronaphthalene, 2-trimethylsiloxy-2-methyl-(p-chloropropiophenone), 1-cyclohexyl-1-(p-chlorobenzoyl)-ethanol, 2-hydroxy-2-(hydroxymethyl)-propiophenone, 2-hydroxy-2,2-di-(hydroxymethyl)-acetophenone, 2-methoxy-2,2-di-(methoxymethyl)-acetophenone, 2-trimethylsiloxy-2,2-dibenzyl-acetophenone, 1,4-di-(α-hydroxyisobutyroyl)-benzene, 2-hydroxy-2-methyl-(p-methylthio-propiophenone), 2-hydroxy-2-ethyl-caprophenone, 1-benzoyl-cyclohexanol, 1-(4-chlorobenzoyl)-cyclopentanol, 2-hydroxy-2-ethyl-butyrophenone and 2-hydroxy-2-methyl-butyrophenone.

The agents which form free radicals on heating and are used as the co-catalyst of component D are those compounds which are known to form free radicals on heating and to be able to initiate free radical polymerisation of ethylenically unsaturated compounds.

Examples are organic peroxides, such as dibenzoyl peroxide, di-(tert.-butyl) peroxide, tert.-butyl hydroperoxide, tert.-butyl perbenzoate, dicumyl peroxide, 1-hydroxy-1'-hydroperoxydicyclohexyl peroxide, cumene hydroperoxide or di-(cyclohexyl) peroxide.

Further examples are azo compounds, such as methyl azoisobutyrate, azoisobutyronitrile, azoisobutyric acid amide, azo-bis-(cyclohexanecarbonitrile) or benzeneazotriphenylmethane.

Compounds which are preferentially suitable as co-catalysts of component D are dibenzyl derivatives of the formula IV

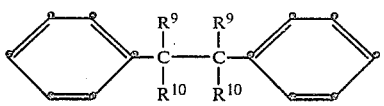

in which $R^9$ is —OH, $C_1$–$C_4$-alkoxy or —O—Si($R^{11}$)($R^{12}$)($R^{13}$) and $R^{11}$, $R^{12}$ and $R^{13}$ independently of one another are $C_1$–$C_4$-alkyl or phenyl and $R^{10}$ is phenyl, cyclohexyl or methyl.

Examples of such compounds are benzpinacol and acetophenonepinacol and their alkyl ethers, silyl ethers or carboxylic acid esters.

Further compounds which are preferentially suitable as component D are oligomeric silyl ethers of aromatic 1,2-diols of the formula V

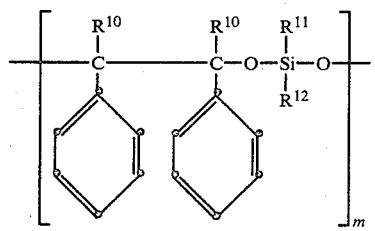

in which $R^{10}$, $R^{11}$ and $R^{12}$ are as defined above and m is 2 to 20. Oligomers of this type are described in German Offenlegungsschrift No. 2,632,294 and can be prepared by the method described in that specification, from aromatic ketones by reaction with diorganochlorosilanes in the presence of magnesium.

All agents which form free radicals on heating are compounds which are stable at room temperature and which decompose only on heating, with the formation of free radical fragments. Depending on the type and constitution, these compounds decompose at diverse high temperatures and this provides the specialist with a means of making a selection for the polymerisation temperature which he desires.

The amount of iodonium salts (component B) required for the process according to the invention is 0.1 to 5% by weight and preferably 0.3 to 3% by weight, based on component A.

The amount of co-catalyst comprising component C which is required for the process according to the invention is 0.3 to 10% by weight and preferably 1 to 5% by weight, based on component A.

The amount of the agent which forms free radicals on heating and comprises component D which is required for the process according to the invention is 0.2 to 10% by weight and preferably 0.5–3% by weight, based on component A.

The mixtures according to the invention can also contain further additives such as are known and customary in the technology of curable compositions. Examples of such additives are pigments, dyes, fillers and reinforcing materials, glass fibres and other fibres, flameproofing agents, antistatic agents or levelling assistants. Further examples are photosensitisers, which shift the spectral sensitivity of the photopolymerisable mixtures into specific ranges, for example organic dyes, perylene, derivatives of anthracene or of thioxanthone.

Further examples are heat stabilisers which increase the storage stability of the photopolymerisable mixtures, for example specific nitriles, amides or sulfoxides. Further examples are antioxidants and light stabilisers, which stabilise the cured compositions against ageing.

If short-wave light is excluded, the mixtures according to the invention can be stored at room temperature for a long time without undergoing change. The polymerisation is effected photochemically or thermally, but preferably by a combination of the photochemical and thermal methods.

Photopolymerisation is effected by irradiation with short-wave light, for example by means of medium-pressure, high-pressure or low-pressure mercury vapour lamps or by means of superactinic fluorescent tubes, which have an emission spectrum in the range of 250–400 m$\mu$. It is not necessary to add any catalyst or other additive to the mixture according to the invention prior to polymerisation.

The exposure time depends, in particular, on the thickness of the coating and on the pigment content. In the case of relatively thin coatings, such as are customary in lacquer technology, exposure times of about one second are sufficient to obtain a film which is no longer tacky.

Frequently, polymerisation continues after exposure to light has ceased, and this manifests itself in an increase in the hardness of the film. Post-polymerisation of this type can also last for many hours in the dark and at room temperature.

Thermally-initiated polymerisation is effected by heating the mixture to elevated temperature. In general, temperatures of 60°–200° C. and in particular of 100°–160° C. are necessary for this purpose, depending on the material used and the polymerisation time desired. The shorter the desired polymerisation time, the higher must be the polymerisation temperature. Usually, polymerisation will be carried out with simultaneous shaping, and thus, for example, in hot presses or in moulds which can be supplied with a source of heat. Heating can be effected, for example, in an oven, by infrared radiation or microwave radiation.

Curing of the mixtures according to the invention in two stages is of particular importance. With this procedure, the mixture can either have been first exposed to light and then heated or first heated and then exposed to light. If the first stage is carried out in corresponding moulds, pre-formed plastics, i.e. so-called prepregs, are obtained which are stable on storage and are still thermoplastic. Crosslinking of the prepolymer to give a thermosetting plastic is effected in the second stage. Since the two stages proceed by different polymerisation mechanisms, it is simple to stop the curing in the first stage. This is an essential advantage of the combination, according to the invention, of 3 catalysts over the known 2-catalyst systems.

Examples of the use of the mixtures according to the invention and of the process according to the invention are the production of paints and coatings on metal, wood, glass, ceramic compositions, plastics, paper, textile sheet-like structures or other solid surfaces. They usually serve to protect or to decorate such articles.

A further example is the use as a curable binder for printing inks, for photolacquers in the electronics industry and for reprographic purposes.

The mixtures and the process are also suitable for the production of laminates and mouldings, for example those made from epoxide resins. In this case, the compositions are in the main employed in combination with glass fibres or other fibres. Examples of this are the production of sheets, tubes or profiles or the production of sports articles or of parts for automobile bodywork.

Examples of mixtures according to the invention and the curing thereof are described in more detail in the examples which follow. In these examples parts and percentages are by weight.

EXAMPLE 1

A 1.0 mm thick rubber ring is placed as a spacer between 2 glass plates. The inside of the ring is filled with the liquid resin mixture. The sample is irradiated, in a PPG irradiation apparatus with 2 lamps each with a power of 80 watt/cm, in 2 passes in each case, from above and below, at a transport speed of 10 m/minute. This corresponds to an exposure time of about 17 seconds. The samples are then heated at 140° C. in an oven for 3 minutes. The Barcol hardness of the cured resin is then measured.

The resin used is a liquid epoxide resin which is based on bisphenol A glycidyl ether and has an epoxide equivalent of 182–194 g/equivalent (Araldit GY 250 from Ciba-Geigy AG, Basel), to which the amounts of catalysts indicated in Table 1 are mixed.

The following catalysts and co-catalysts are used in the examples which follow:
Ca 1 Diphenyliodonium hexafluorophosphate
Ca 2 Diphenyliodonium hexafluoroarsenate
Co 1 2-Benzoyl-2-propanol
Co 2 Benzil dimethyl ketal
Co 3 1-Benzoylcyclohexanol
Co 4 Benzoin isopropyl ether
Co 5 α,α-Diethoxyacetophenone
Co 6 2-Isopropylthioxanthone
CoCa 1 Benzpinacol
CoCa 2 Oligomer of the formula V, in which $R^{10}$ is phenyl and $R^{11}$ and $R^{12}$ are methyl
CoCa 3 Oligomer of the formula V, in which $R^{10}$ is cyclohexyl and $R^{11}$ and $R^{12}$ are methyl
CoCa 4 Oligomer of the formula V, in which $R^{10}$, $R^{11}$ and $R^{12}$ are methyl
CoCa 5 Bis-(trimethylsilyl) ether of benzpinacol
CoCa 6 Dimethyl ether of benzpinacol

TABLE 1

| Catalyst/co-catalyst of | | | |
|---|---|---|---|
| Component B | Component C | Component D | Barcol hardness |
| 1% Ca 1 | 3% Co 1 | — | 18 |
| 1% Ca 1 | — | 2% CoCa 1 | not measurable |
| — | 3% Co 1 | 1% CoCa 2 | not measurable |
| 1% Ca 1 | — | 2% CoCa 2 | not measurable |
| 1% | 3% Co 1 | 1% CoCa 1 | 30 |
| 1% Ca 1 | 3% Co 1 | 1% CoCa 2 | 58 |
| 1% Ca 1 | 3% Co 1 | 2% CoCa 2 | 65 |
| 1% Ca 2 | 3% Co 2 | 1% CoCa 2 | 52 |

EXAMPLE 2

The procedure of Example 1 is repeated, except that two samples of the same composition are always cured differently. One sample is first irradiated and then heated to 140° C. (process I)—as in Example 1—and the other sample is first heated and then irradiated with UV light for 17 seconds (process II). The following photosensitisers were additionally used in the case of a few samples.
S 1 9,10-Diethoxyanthracene
S 2 Perylene Table 2 shows the Barcol hardness of the samples cured by the two process variants.

TABLE 2

| Component B | Component C | Component D | Sensitiser | Barcol hardness after Process I | Barcol hardness Process II |
|---|---|---|---|---|---|
| 1% Ca 2 | 3% Co 3 | 1% CoCa 1 | — | 35 | 35 |
| 1% Ca 2 | 3% Co 3 | 1% CoCa 2 | — | 50 | 54 |
| 1% Ca 2 | 3% Co 3 | 1% CoCa 3 | — | 57 | 52 |
| 1% Ca 2 | 3% Co 3 | 1% CoCa 4 | — | 56 | 57 |
| 1% Ca 2 | 3% Co 3 | 1% CoCa 5 | — | 59 | 59 |
| 1% Ca 2 | 3% Co 3 | 1% CoCa 6 | — | 55 | 53 |
| 1% Ca 2 | 3% Co 4 | 1% CoCa 2 | — | — | 40 |
| 1% Ca 2 | 3% Co 5 | 1% CoCa 2 | — | 44 | 42 |
| 1% Ca 1 | 0.1% Co 6 | 1% CoCa 2 | — | 57 | 58 |
| 1% Ca 1 | 3% Co 3 | 1% CoCa 2 | 0.01% S 1 | 52 | 58 |
| 1% Ca 1 | 3% Co 2 | 1% CoCa 2 | 0.01% S 2 | 52 | 49 |
| 1% Ca 1 | 3% Co 3 | 1% CoCa 2 | 0.01% S 2 | 53 | 58 |

EXAMPLE 3

The procedure of Example 2 is repeated, except that, in place of Araldit 250, a cycloaliphatic epoxide resin with 7.0–7.5 epoxide equivalents/kg (Araldit CY 179), which is of low viscosity, is used.

The catalyst used is 1% of Ca 2 and the co-catalyst used is 3% of Co 3 and 1% of CoCa 2. The Barcol hardness is 30 after curing process I and 28 after curing process II.

EXAMPLE 4

The procedure of Example 2 is repeated, except that a mixture of 80 parts of Araldit G 250 and 20 parts of a diacrylate of the formula

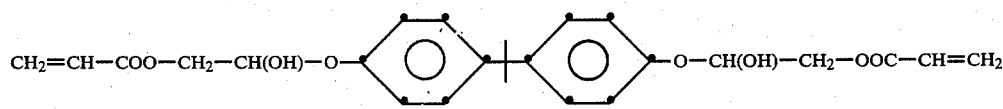

and $R^{12}$ are methyl is used, to which 1% of Ca 2, 3% of Co 3 and 1% of CoCa 2 are added as the catalyst. The Barcol hardness is 47 after curing process I and 48 after curing process II.

What is claimed is:

1. A photochemically or thermally polymerisable mixture containing (A) one or more cationically polymerisable compounds, (B) an aromatic iodonium salt as the polymerisation catalyst, (C) one or more photoinitiators which is an aromatic carbonyl compound, as the co-catalyst, and (D) an agent which forms free radicals on heating, as the second co-catalyst.

2. A mixture according to claim 1, wherein component (A) is an epoxide compound or a mixture thereof with other cationically polymerisable compounds, or a mixture of two or more epoxide compounds.

3. A mixture according to claim 1, wherein component (B) is an aromatic iodonium salt of the formula I $$[Ar^1-I-Ar^2]^+[MQ_n]^- \quad \text{I}$$

in which $Ar^1$ and $Ar^2$ independently of one another are phenyl, naphthyl or phenyl which is substituted by one or more of the radicals $C_1$–$C_8$-alkyl, phenyl, phenoxy, halogen, nitro or $C_1$–$C_4$-alkoxy, or $Ar^1$ and $Ar^2$ together are a divalent radical of the formula II

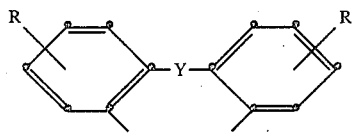

in which Y is a direct bond, —O—, —CH$_2$— or —CO— and R is $C_1$–$C_4$-alkyl, halogen, nitro or $C_1$–$C_4$-alkoxy, M is a metal atom or metalloid atom from the series comprising B, P, As, Sb, Sn, Bi and Fe, Q is fluorine or chlorine and n is 4, 5 or 6 and 1 larger than the valency of M.

4. A mixture according to claim 3, wherein component B is a salt of the formula I in which $Ar^1$ and $Ar^2$ are phenyl or tolyl and $[MQ_n]^-$ is one of the anions $BF_4^-$, $PF_6^-$, $AsF_6^-$ or $SbF_6^-$.

5. A mixture according to claim 1, wherein component (C) is a photoinitiator selected from the group consisting of benzoin, α-alkyl- and α-hydroxymethylbenzoins, benzoin ethers, dialkoxyacetophenones, benzil monoketals, thioxanthone and thioxanthone derivatives.

6. A mixture according to claim 1, wherein component (C) is an arylcarbonyl compound of the formula III

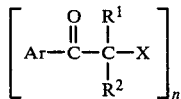

in which n is 1 or 2, Ar, if n is 1, is aryl having 6–14 C atoms, tetrahydronaphthyl, thienyl, pyridyl, furyl or phenyl which is substituted by one or more of the radicals F, Cl, Br, CN, OH, $C_1$–$C_{12}$-alkyl, —OAlk, —O-phenyl, —SAlk, —S-phenyl, —SO$_2$-phenyl, COOAlk and Alk is a lower alkyl radical having 1–4 C atoms, and, if n is 2, is $C_6$–$C_{12}$ arylene or a -phenylene-T-phenylene-group, X is one of the groups —OR$^4$ or —O-SiR$^5$(R$^6$)$_2$, or together with R$^1$ is a —O—CH(R$^7$)— group, T is —O—, —S—, —SO$_2$— or —CH$_2$—, R$^1$ is $C_1$–$C_8$ alkyl, which is unsubstituted or substituted by —OH, —OAlk, $C_2$–$C_8$ acyloxy, —COOAlk or —CN, or $C_3$–$C_4$ alkenyl, $C_5$–$C_6$-cycloalkyl or $C_7$–$C_9$ phenylalkyl, R$^2$ has one of the meanings defined for R$^1$ or is a —CH$_2$CH$_2$R$^8$ group, or together with R$^1$ is $C_2$–$C_8$ alkylene or $C_3$–$C_9$ oxa- or -aza-alkylene, R$^4$ is hydrogen, $C_1$–$C_{12}$ alkyl, $C_2$–$C_6$ alkyl which is substituted by OH, OAlk or CN, or $C_3$–$C_5$ alkenyl, cyclohexyl, benzyl, unsubstituted phenyl or phenyl substituted by Cl or Alk, or 2-tetrahydropyranyl, R$^5$ and R$^6$ are identical or different and are $C_1$–$C_4$ alkyl or phenyl, R$^7$ is hydrogen, $C_1$–$C_8$ alkyl or phenyl and R$^8$ is —CONH$_2$, —CONHAlk, —CON(Alk)$_2$, —P(O)(OAlk)$_2$ or 2-pyridyl.

7. A mixture according to claim 6, wherein component (C) is a compound of the formula III in which n is 1, Ar is phenyl, chlorophenyl or $C_7$–$C_{10}$-alkylphenyl, $R^1$ and $R^2$ either are both methyl or together are pentamethylene and X is —OH, —OCH$_3$, —O-allyl or —O-Si(CH$_3$)$_3$.

8. A mixture according to claim 1, wherein component (D) is a dibenzyl derivative of the formula IV

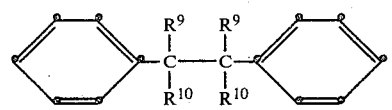

in which $R^9$ is $C_1$–$C_4$-alkoxy or —OSi(R$^{11}$)(R$^{12}$)(R$^{13}$) and $R^{11}$, $R^{12}$ and $R^{13}$ independently of one another are $C_1$–$C_4$-alkyl or phenyl and $R^{10}$ is phenyl, cyclohexyl or methyl, or component (D) is an oligomer of the formula V

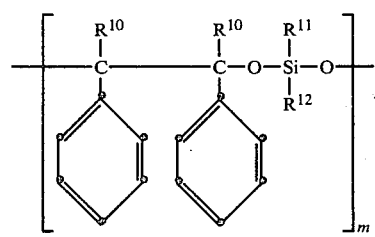

in which m is 2 to 20.

9. A mixture according to claim 1, wherein component (D) is benzpinacol.

10. A mixture according to claim 1, which contains catalytic amounts of a photosensitiser.

11. A process for the polymerisation of cationically polymerisable compounds by irradiation with short-wave light or by heating in the presence of an aromatic iodonium salt as the polymerisation catalyst, wherein a photoinitiator which is an aromatic carbonyl compound and an agent which forms free radicals on heating are additionally used as co-catalysts.

12. A process according to claim 11, wherein the polymerisation is carried out in two stages, the first stage being carried out by irradiation and the second stage by heating, or vice versa.

13. A process according to claim 11, wherein an epoxide compound or a mixture of epoxide compounds is polymerised.

14. A process according to claim 11, wherein a phenolformaldehyde resin or an aminoplast is polymerised.

* * * * *